United States Patent [19]

Markarian

[11] 4,447,854
[45] May 8, 1984

[54] OVAL DUAL-AC-CAPACITOR PACKAGE

[75] Inventor: Paul M. Markarian, North Adams, Mass.

[73] Assignee: Sprague Electric Company, North Adams, Mass.

[21] Appl. No.: 443,266

[22] Filed: Nov. 22, 1982

[51] Int. Cl.³ .............................................. H01G 4/32
[52] U.S. Cl. .................................................. 361/329
[58] Field of Search ......... 361/301, 302, 323, 328–331

[56] References Cited

U.S. PATENT DOCUMENTS

| | | | |
|---|---|---|---|
| 3,441,816 | 4/1969 | Butrico | 361/329 X |
| 3,522,498 | 8/1970 | Price | 361/323 |
| 3,691,435 | 9/1972 | Winn | 361/330 |
| 3,921,041 | 11/1975 | Stockman | 361/330 |
| 4,326,237 | 4/1982 | Markarian et al. | 361/329 |
| 4,388,669 | 6/1983 | Cichanowski | 361/273 X |

FOREIGN PATENT DOCUMENTS 2089569  6/1982  United Kingdom .

Primary Examiner—Donald A. Griffin

[57] ABSTRACT

Two wound-metallized-polypropylene capacitor sections of circular-cylindrical dimensions are housed in an oval metal can. One section forms a single capacitor. One metal film electrode of the other section is opened or interrupted in a middle position of the winding, and the uniterrupted other film electrode is terminated at the bottom end of this other section while the two interrupted inner and outer winding films are separately terminated at the top end. The bottom of both sections are connected together and to a feed through terminal in the housing wall. The above said outer film is connected via a conductive strap to the top termination of the one section and a second housing terminal while the inner film is connected only to a third housing terminal. In this way, an optimally dense oval package provides two capacitors at the package terminals that may have a ratio of values ranging from 3 to 12, ideally suited for use in air conditioners.

14 Claims, 7 Drawing Figures

U.S. Patent    May 8, 1984    Sheet 1 of 2    4,447,854
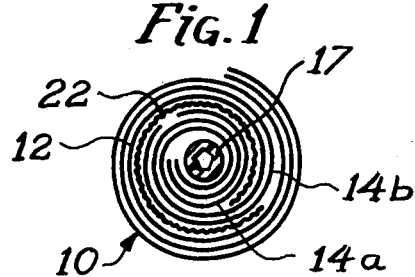
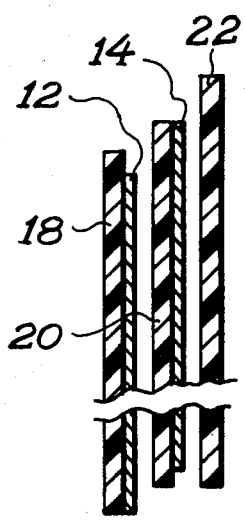
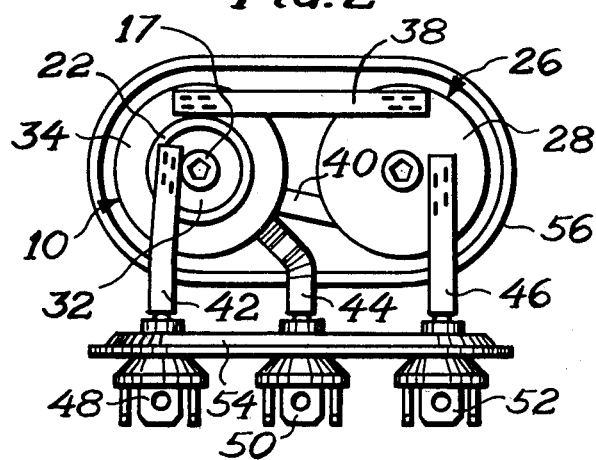
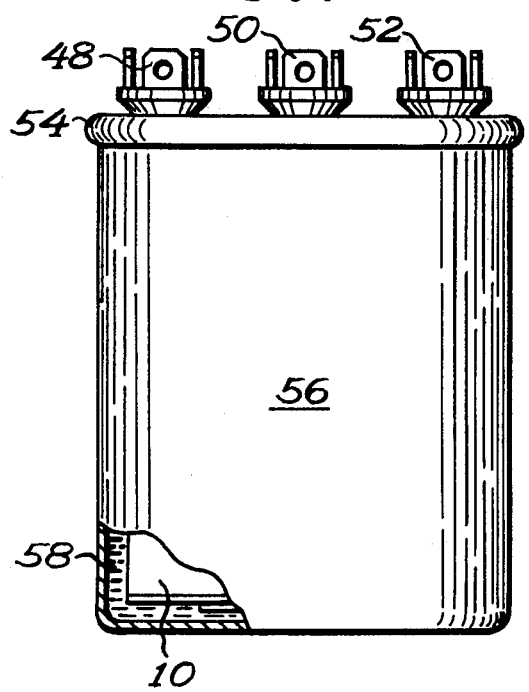
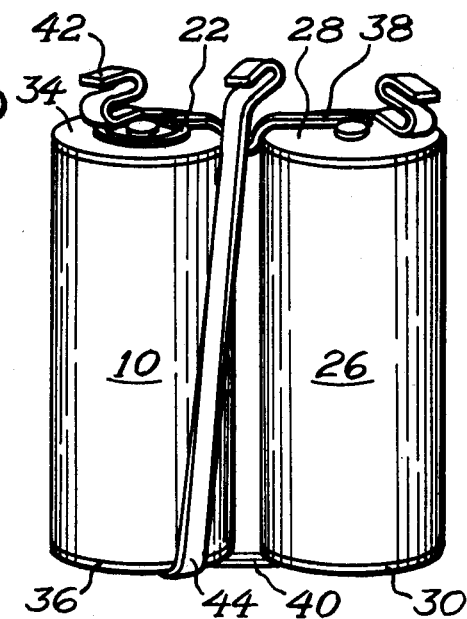

OVAL DUAL-AC-CAPACITOR PACKAGE

BACKGROUND OF THE INVENTION

This invention relates to a dual-section oil-filled AC capacitor package and more particularly to such a package of oval-cylindrical shape having a high packing density and low cost. The invention is even more specifically directed to dual AC capacitors wherein the ratio of capacitances is greater than unity and usually from about 3 to 12. Such capacitors are especially suitable for incorporation in air-conditioners.

Air conditioners typically employ a compressor-motor-run capacitor and a fan-motor-run capacitor having the above noted relative values. The two run capacitors are typically of the oil filled type and are provided in the same package to save space and weight. The corresponding motor-start capacitors are more than an order of magnitude larger in capacitance and normally are an electrolytic type, not includable in the same package with the motor run capacitors.

An earlier oval AC capacitor package containing a single capacitor section typically employed a wound-foil-oil-filled type section having been flattened to snugly fit the oval can. It has more recently been the practice by a number of air conditioner manufacturers to use an oval dual capacitor that includes a small diameter section for the fan-run capacitor and a large diameter section for the compressor-run capacitor, both sections having a circular-cylindrical shape, i.e. not flattened. Such a construction, however, provides a low packing density even though in the newer capacitors, there is substituted a metallized polypropylene sheet for the bulkier foil of earlier AC capacitors. The low packing density of that oval package, having two round sections of disparate diameters, is typically not less than 20% in cost or weight compared with two discrete AC capacitors. For these reasons, dual AC capacitors have found limited use in the highly standardized air-conditioning industry.

For both single capacitor and dual capacitors used in the motor-run circuits, the industry has invested heavily in tooling that commits them to the use of AC capacitors packaged in an oval-cylindrical can. Those oval cans accommodate two circular-cylindrical capacitor sections side-by-side. The commitment to oval cans was made more than a decade ago.

Further illustrating industry commitment to oval packages, there has been available a circular-cylindrical dual-AC-capacitor package, described by Sherry in the U.K. Patent Application GB No. 2,089,569 A, published June 23, 1982 and assigned to the same assignee as is the present invention. It includes a single round section having a pair of co-wound metal films, one of which serves as a common electrode and the other of which is open in a middle region to provide the two other electrodes of the two capacitors. The single round section fits snugly in a circular-cylindrical can. A major advantage of this high-density package is that the capacitor section occupies almost all of the can, requiring therefore a minimum of the expensive dielectric oil and also leading to a package having a relatively low weight. Unfortunately, as noted above, the major users demand an oval package that is physically compatable with air conditioners made many years ago and those of similar design being manufactured currently.

It is an object of this invention to provide an oval dual-AC-capacitor package having a high packing efficiency and low cost.

It is a further object of this invention to provide such a capacitor wherein the ratio of the two capacities is greater than 1 and less than 12.

SUMMARY OF THE INVENTION

An oval dual-AC-capacitor package has a substantially-oval-cylindrical housing and a cover over one housing end. Three feed-through terminals are provided, preferably mounted in the cover. Two circular-cylindrical capacitor sections are enclosed in the housing. A dielectric oil preferably fills the remainder of the housing to essentially eliminate air in the package that more readily breaks down when subjected to electrical stresses. Each of the two sections is made of two convolutely wound sheet-plastic strips and two metal films that are positioned alternately between said plastic strips so that the two metal films are every where spaced apart by the plastic strips. The two metal films in a first of the sections are each wholly contiguous and unitary as is one of the metal films in the second section. The other of the films in the second section has been opened in a middle portion to form an inner-winding portion and an outer-winding portion. An electrical connection means is provided for connecting one of the first-section-metal films to the above-said one wholly contiguous film of the second section and further to a first of the cover terminals, for connecting the inner-winding metal film portion in the second section to a second of the cover terminals and for connecting the outer-winding metal film portion to the other of the first-section metal films and further to the third of the cover terminals.

Alternatively, in the aforesaid electrical connection means the inner- and outer-winding metal film portions may be interchanged, especially when it is desired to provide a ratio of about 1 to 3 between the two capacitances as seen at the package terminals. Oval dual capacitors providing such low ratios may be useful in special air conditioners wherein the sizes of the compressor motor and fan motor are nearly the same.

Thus in the second section, an inner capacitor is comprised of the inner-winding-metal-film portion and the inner part of the unitary metal film; an outer capacitor is comprised of the outer part of the unitary film and the above described outer-winding-metal-film portion. The first section includes only one capacitor. The aforesaid electrical connection means connects the capacitor of the first section in parallel with the outer (or inner) capacitor of the second section. These paralleled capacitors are then connected to the one terminal and the third terminal. The inner (or outer) capacitor of the second section is connected between the second terminal and the one terminal. The one terminal is thereby seen to serve as a common terminal in the package that provides access to a small and a large capacitor via the second and third package terminals, respectively.

The dual capacitor oval package of this invention is capable of providing a high value capacity and a low value capacity, the ratio of these values being between 1 and 12, while at the same time providing a dense package at low cost.

BRIEF DESCRIPTION OF THE DRAWING

FIG. 1 shows a diagramatic representation of the winding core and two electrodes in a convolutely-wound dual-capacitor section employed in this invention.

FIG. 2 shows in top view such a dual capacitor section along with an equal diameter single-capacitor section in an oval can, representing a preferred embodiment of an oval capacitor package of this invention.

FIG. 3 shows a partial side sectional view of a portion of the dual capacitor section of FIGS. 1 and 2 with the elements spaced apart for clarity.

FIG. 4 shows in perspective view the two capacitor sections of FIG. 2, prior to their assembly in the can.

FIG. 5 is a side view, after assembly of the cover to the can, of the dual capacitor package of FIG. 2.

DESCRIPTION OF THE PREFERRED EMBODIMENTS

Figure 6:
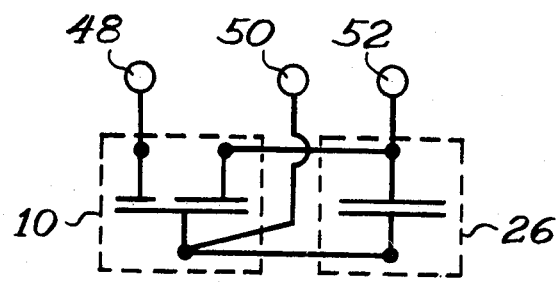
FIG. 6 is a schematic diagram of the capacitor package of FIG. 2.

A dual capacitor section 10, represented in FIGS. 1, 2 and 3 includes two metal electrodes 12 and 14 convolutely wound on a plastic winding core 17 with insulating layers 18 and 20 interposed between the electrodes 12 and 14 to provide a small uniform space therebetween. A plastic sheet is used for each of the insulating layers 18 and 20 and it is preferred that the electrodes 12 and 14 be formed directly on one or both of the plastic layers 18 and 20 by vacuum deposition of a metal such as aluminum. One of the electrodes, i.e. metal film 14 is interrupted in a central portion of the winding to form an inner-winding electrode 14a and an outer winding electrode 14b. A third insulating layer 22, represented as a wavy line in FIG. 1, is inserted in the winding near that central winding portion. Layer 22 is only long enough to go a few, namely at least more than one, winding turns around. The layer 22 is also offset in the winding to extend from an end thereof and serve as an insulating barrier between the less prominently extended edges of inner-winding film 14a and the outer-winding film 14b. Such a single section dual capacitor is described in more detail in the copending patent application Ser. No. 215,594, filed Dec. 12, 1980, and assigned to the same assignee as in the present invention. Note that metal film 12 is contiguous and unitary and so serves as a common electrode for both of the two capacitors of section 10.

Another wound section 26 has the same length and outside diameter as section 10. Section 26 is also made by convolutely winding two metallized sheets of polypropylene (not shown) preferably having the same thickness as do the plastic insulating layers 18 and 20 in section 10. The thickness of the metallized electrodes, typically a few hundred angstroms is insignificant relative to the thickness, typically 6 to 12 $\mu$m, of the plastic. The two metal films in section 26, as commonly found also in most capacitor sections, are each completely contiguous and unitary so that only one capacitor is formed.

After the section 26 is wound, a molten metal is sprayed by well known means on the section ends forming metal terminations 28 and 30 at either end, respectively contacting the two electrodes. During the metal end spraying of section 10, the extending barrier layer 22 provides two terminationss 32 and 34 at the top of the section 10, respectively contacting electrodes 14a and 14b, while one termination 36 is formed at the other section end contacting common electrode 12.

A metal connecting strap 38 is welded to terminations 28 and 34 at the top of the section 26 and 10 as shown in FIGS. 2 and 4. Another strap 40 is welded to bottom terminations 30 and 36. Third, fourth and fifth metal straps 42, 44 and 46 are respectively welded to terminations 32, 36 and 28 and then are respectively welded to feed through terminals 48, 50 and 52 that are mounted in a metal cover plate 54. It is preferred, if not necessary, that the inner winding electrode 14a be the shorter of the electrodes 14a and 14b in section 10, so that short electrode 14a generate a large enough area as seen in end view (FIG. 2) to accomodate a welded connecting strap 42. The sections 10 and 26 are placed in an oval metal can 56 and the cover 54 is placed over the open can end and sealed thereto to provide the capacitor package seen in side view in FIG. 5.

When the package is to provide two very different capacity values, it is important that the outer-winding electrode portion 14b (in section 10 of FIG. 2) be connected (via conductive strip 38) to the top of section 26 in order to form the large value capacitor appearing (electrically) across terminals 50 and 52. It is important because if one had instead connected the inner-winding electrode portion 14a to section 26, the ratio of the two capacitor values obtainable at the package terminals 48, 50 and 52 would not be nearly so great. As shown the two terminations 32 and 34 have about the same dimensions in a radial direction, making about the same room available to fit and weld conductive strips 42 and 38. For such a section having an OD of 1.9 inches (48 mm), the electrical capacity associated with outer electrode 14b is more than four times (about 4.6) the capacity of the inner winding electrode 14a. For this particular structure (FIG. 2), the ratio of capacities at the terminals is about 10:1. Had the above-mentioned reverse connections been made, that terminal-capacities ratio would have been only 1.2:1.

From FIG. 2 it can be seen that the can 56 is not exactly oval according to the classical definition of oval. It has circular left and right portions that are connected by straight side wall portions. However, the term oval has been applied to such cans in the capacitor industry for many years, having originally been made to accomodate a wound-and-flattened section, and is so used herein. (Such sections had foil electrodes. Flattening metallized plastic sections results in serious degradation of the electrical performance.)

In a final step in the manufacture of the dual package of FIG. 5, the can 56 is submersed in a dielectric oil 58 under reduced atmospheric pressure to fill the can 56 with oil through a conventional fill hole (not shown) in cover 54. The fill hole is then sealed closed.

A circuit schematic in FIG. 6 gives a picture of the connection within the package of FIG. 5.

When the sections 10 and 26 are about equal in height and outside diameter, an optimum amount of electrical capacity is packed into the oval can 56. Besides providing the greatest capability for a given package size and weight, it is least expensive since the relative costs per volume of metallized polypropylene is much less than it is for dielectric oil.

Figure 7:
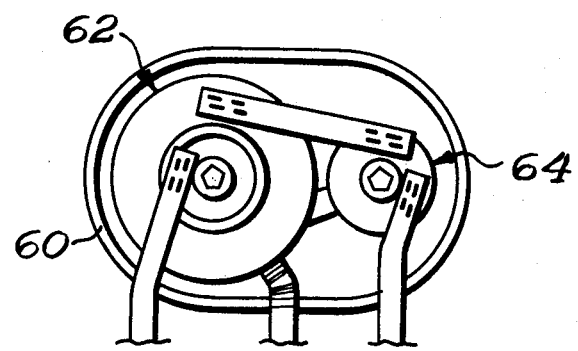
FIG. 7 is a top view of another oval capacitor package of this invention without a top cover.

Another oval can 60, shown in FIG. 7, having a smaller ratio of length to width (e.g. 1.5) than does can 56 of FIG. 2, is also in much demand as a capacitor housing by air-conditioner manufacturers. After inserting a section 62 that is about as large in outside diameter that can be safely fitted in the can 56, there is not enough room for another equal sized section. FIG. 7 illustrates a dual capacitor package using that can 60 containing a smaller second section 64 providing an optimally dense package. This package, containing sections of different sizes, is similar to one described in U.S. Pat. No. 4,326,237, issued Apr. 20, 1982 and assigned to the same assignee as is the present invention. The dual capacitor package of FIG. 7 is capable of providing much larger ratios of capacity than that of the patent employing two single-capacitor-sections of different sizes. Furthermore, the maximum capacity value of the larger capacitor can be substantially greater also, although the maximum total volt-microfarad product that can be provided in each of these packages is the same.

Insulative caps are fitted over the ends of the pair of sections described in the aforementioned U.S. Pat. No. 4,326,237 to keep the sections spaced briefly apart and from the surrounding metal walls of the can. Such caps or other spacer means are advisable to use in packages of this invention but have been omitted from the drawings for a clearer view of the other features.

Also missing from structures shown in FIGS. 2, 4 and 7 herein, is a circuit interrupter plate such as plate 50 in the U.S. Pat. No. 4,326,237, such interrupters being considered optional.

A number of examples of packages of this invention are given below along with examples of packages as shown in the U.S. Pat. No. 4,326,237 having the same capacity values as measured at the terminals and the same oval profile dimensions. Allowance has been made in all packages for plastic end caps and interrupter plates. The winding core in all capacitor sections is the same diameter. Single-side-metallized polypropylene 8 $\mu$m thick is used in all sections. In the dual section (e.g. 10 or 62), the inner electrode is the shorter.

In a first group of the examples an oval can like that shown in FIG. 2 is used and the sections 10 and 26 are of equal diameter and length. The oval profile (FIG. 2) of the can 56 has a long axis dimension (horizontal), e.g. 93 mm, that is about twice the short axis dimension (vertical), e.g. 50 mm. From example to example, however the section lengths and corresponding can heights change according to the capacity values provided at the package terminals as is indicated in Table 1. For certain capacity values, a prior art type package cannot be built, indicated by our asterisk (*) in the Tables because it would require that one or both of its sections be so long that the corresponding metallized plastic of which it would be built would be beyond a critically wide dimension, namely so wide that the risk of puckering and wrinkling at metallizing, slitting and winding becomes unacceptably great. This critical width for 8 $\mu$m metallized polyethylene is assumed here to be 125 mm but it will still be seen from these examples that at any other like value, packages of this invention still offer significant advantage in packing density and are often the only construction that can be built at all in standard oval cans.

TABLE 1

| Pkg. Capacity Values ($\mu$fd) | This Invention (FIG. 2) | | | | Prior Art |
|---|---|---|---|---|---|
| | Section 10 ($\mu$fd) | | Section 26 ($\mu$fd) | Can Ht. (mm) | Can Ht. (mm) |
| 55/15 | 15 | 20 | 35 | 130 | * |
| 50/10 | 10 | 20 | 30 | 120 | * |
| 40/5 | 5 | 17½ | 22½ | 92 | 149 |
| 25/5 | 5 | 10 | 15 | 76 | 124 |

TABLE 1-continued

| Pkg. Capacity Values ($\mu$fd) | This Invention (FIG. 2) | | | | Prior Art |
|---|---|---|---|---|---|
| | Section 10 ($\mu$fd) | | Section 26 ($\mu$fd) | Can Ht. (mm) | Can Ht. (mm) |

The underlining of two capacity values in the Tables indicates a parallel connection to make the larger of the two package capacitances.

For another group of examples, described in Table 2, the advantage that a package of this invention has for the situation wherein the oval can has a short "oval" shape is illustrated in FIG. 7 and the most dense package has two sections of disparate diameters. This can 60 has a long axis dimension (horizontal in FIG. 7), e.g. 74 mm, that is substantially less than twice the short axis dimension (vertical), e.g. 48 mm. For this kind of can, the invention makes possible a dense package offering ratios of capacity between 3 and 1 that are not possible via the prior art construction.

TABLE 2

| Pkg. Capacity Values ($\mu$fd) | This Invention (FIG. 7) | | | | Prior Art |
|---|---|---|---|---|---|
| | Section 62 ($\mu$fd) | | Section 64 ($\mu$fd) | Can Ht. (mm) | Can Ht. (mm) |
| 29/15 | 15 | 20 | 9 | 130 | * |
| 20/17½ | 20 | 10 | 7½ | 120 | * |
| 15/12½ | 15 | 7½ | 5 | 92 | * |
| 15/5 | 5 | 11 | 4 | 76 | 98 |

Thus, with oval cans as in FIG. 2 the advantage of the invention is greatest for higher ratios in package capacitor values whereas for oval cans as in FIG. 7 it is with the low capacity ratios for which only a package of this invention could be used.

What is claimed is:

1. An oval dual-AC-capacitor package comprising a substantially-oval-cylindrical housing having a cover at one end thereof; three feed-through terminals being mounted in said cover; two circular-cylindrical capacitor sections having essentially the same length, each of said sections being enclosed in said housing and having two convolutely wound sheet-plastic strips and two metal films respectively positioned alternately between said plastic strips, each of said metal films in a first of said sections being wholly contiguous and unitary, one of said films in the second of said sections also being contiguous and unitary, the other of said films in said second section having been opened in a middle portion thereof and divided into an inner winding portion and an outer winding portion; and electrical connection means (a) for connecting one of said first-section-metal films to said one film of said second section and further to a first of said cover terminals, (b) for connecting said inner-winding metal film portion to a second of said cover terminals and (c) for connecting said outer-winding metal film portion to the other of said first-section metal films and to the third of said cover terminals.

2. The capacitor package of claim 1 wherein the outside diameters of said first and second sections are essentially equal and the long axis dimension of said oval housing is about twice the short axis dimension of said housing.

3. The capacitor package of claim 2 wherein the capacity as measured between said first and third terminals is up to 12 times greater than the capacity as measured between said first and second terminals.

4. The capacitor package of claim 2 wherein the capacity as measured between said first and third terminals is from 3 to 10 times greater than the capacity as measured between said first and second terminals.

5. The capacitor package of claim 1 wherein said metal films are non-self-supporting having a thickness of a few hundred angstroms.

6. The capacitor package of claim 1 wherein said sheet-plastic strips are of polyproylene all of which have essentially the same thickness lying between 6 to 12 mm.

7. The capacitor package of claim 1 wherein said housing is additionally filled with a dielectric oil.

8. An oval dual-AC-capacitor package comprising a substantially-oval-cylindrical housing having a cover at one end thereof; three feed-through terminals being mounted in said cover; two circular-cylindrical capacitor sections having essentially the same length, each of said sections being enclosed in said housing and having two convolutely wound sheet-plastic strips and two metal films respectively positioned alternately between said plastic strips, each of said metal films in a first of said sections being wholly contiguous and unitary, one of said films in the second of said sections also being contiguous and unitary, the other of said films in said second section having been opened in a middle portion thereof and divided into an inner winding portion and an outer winding portion; and electrical connection means (a) for connecting one of said first-section-metal films to said one film of said second section and further to a first of said cover terminals, (b) for connecting said outer-winding metal film portion to a second of said cover terminals and (c) for connecting said inner-winding metal film portion to the other of said first-section metal films and to the third of said cover terminals.

9. The capacitor package of claim 8 wherein the outside diameter of said first section is substantially smaller than that of said second section and the long axis dimension of said oval housing is substantially less than twice that of the short axis dimension of said housing.

10. The capacitor package of claim 9 wherein the capacity as measured between said first and third terminals is up to 12 times greater than the capacity measured between said first and second terminals.

11. The capacitor package of claim 9 wherein the capacity as measured between said first and third terminals is from 1 to 3 times greater than the capacity as measured between said first and second terminals.

12. The capacitor package of claim 8 wherein said metal films are non-self-supporting having a thickness of a few hundred angstroms.

13. The capacitor package of claim 8 wherein said sheet-plastic strips are of polypropylene all of which have essentially the same thickness lying between 6 to 12 mm.

14. The capacitor package of claim 8 wherein said housing is additionally filled with a dielectric oil.

* * * * *